(12) United States Patent
Katzur

(10) Patent No.: US 6,240,303 B1
(45) Date of Patent: May 29, 2001

(54) VOICE RECOGNITION BUTTON FOR MOBILE TELEPHONES

(75) Inventor: Ran Katzur, North Potomac, MD (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/064,897

(22) Filed: Apr. 23, 1998

(51) Int. Cl.⁷ .................................................. H04M 1/66
(52) U.S. Cl. ........................ 455/563; 455/406; 455/550; 455/564; 379/88
(58) Field of Search .................................. 485/550, 563, 485/564, 567, 569; 379/68.01, 88.02, 88.03, 88.04, 368, 369, 370, 433, 357; 455/422, 406, 405, 411, 558, 575; 380/28

(56) References Cited

U.S. PATENT DOCUMENTS

| | | | |
|---|---|---|---|
| 4,731,811 | 3/1988 | Dubus | 379/58 |
| 5,148,471 | 9/1992 | Metroka et al. | 379/58 |
| 5,203,009 * | 4/1993 | Bogusz et al. | 455/33.1 |
| 5,222,121 * | 6/1993 | Shomada | 379/88 |
| 5,297,183 | 3/1994 | Bareis et al. | 379/59 |
| 5,335,261 * | 8/1994 | Fujinaka | 379/58 |
| 5,335,276 | 8/1994 | Thompson et al. | 380/21 |
| 5,353,330 | 10/1994 | Fujiwara | 379/58 |
| 5,353,376 | 10/1994 | Oh et al. | 395/2.42 |
| 5,365,570 * | 11/1994 | Boubelik | 379/59 |
| 5,402,481 | 3/1995 | Waldman | 379/355 |
| 5,420,912 | 5/1995 | Kopp et al. | 379/63 |
| 5,450,525 * | 9/1995 | Russell et al. | 395/2.84 |
| 5,574,772 * | 11/1996 | Scalisi et al. | 379/58 |
| 5,583,965 * | 12/1996 | Douma et al. | 395/2.84 |
| 5,651,056 | 7/1997 | Eting et al. | 379/88 |
| 5,659,597 | 8/1997 | Bareis et al. | 455/563 |
| 5,675,632 | 10/1997 | Odaka et al. | 379/67 |
| 5,675,704 | 10/1997 | Juang et al. | 395/2.55 |
| 5,805,672 * | 9/1998 | Barkat et al. | 379/67 |
| 5,864,603 * | 1/1999 | Haavisto et al. | 379/88 |
| 5,963,639 * | 10/1999 | Kanamaki | 379/418 |
| 6,035,217 * | 3/2000 | Kravitz | 455/561 |

* cited by examiner

Primary Examiner—Daniel Hunter
Assistant Examiner—Pablo Tran

(57) ABSTRACT

A voice recognition system having an enhanced button that allows a driver to reduce his risk of being involved in an accident while operating a vehicle and using a mobile telephone. The present invention is a mobile telephone having a voice recognition system which receives and acts on voice commands. Once the voice recognition system is activated, the mobile telephone can be operated in a hands free mode. The voice recognition system is used to automatically perform the same functions as a keypad. Since a driver can use just the voice recognition system, a keypad is no longer necessary. A mobile telephone equipped with a voice recognition system of the present invention requires only two buttons, a power button and a voice recognition button. To provide further safety, the voice recognition button is implemented to distinguish the voice recognition button from the other buttons to provide easier activation of the voice recognition system. The present invention can also be applied to other types of telephones and can be especially useful to a vision impaired person.

46 Claims, 1 Drawing Sheet

VOICE RECOGNITION BUTTON FOR MOBILE TELEPHONES

FIELD OF THE INVENTION

This invention relates generally to a voice recognition system for mobile telephones. More specifically, the present invention is a voice recognition system for mobile telephones which is activated by an enhanced recognition button and allows the mobile telephone user to operate the mobile telephone in a hands free mode.

BACKGROUND OF THE INVENTION

While mobile telephones offer convenience and benefits to drivers, they come at the expense of road safety. It has been statistically proven that drivers who are using mobile telephones while operating a vehicle are four times more likely to be involved in an accident. Presently, most mobile telephones require the driver to use one hand to hold the mobile telephone thereby forcing the driver to drive with only one hand. Since the driver is using one hand to hold the mobile telephone and the other hand to hold the steering wheel, shifting a standard shift vehicle or signaling becomes hazardous. In order for the driver to shift gears, the driver must either release the mobile telephone or the steering wheel. Typically, drivers release the steering wheel to shift gears. Driving a vehicle with no hands on the steering wheel is not a preferred method of driving. However, when it comes to signaling, drivers typically do not release the steering wheel or the mobile telephone, drivers just forego signaling. Changing lanes or turning without signaling is a safety concern and can lead to accidents.

Unfortunately, these are not the only problems drivers encounter when operating a vehicle and using a mobile telephone at the same time. Problems also occur when a driver receives a telephone call, the driver has to activate the mobile telephone to receive the call. The driver either takes his eyes off of the road or blindly tries to locate and activate the mobile telephone.

Similar problems also occur when a driver wishes to place a telephone call. To place a call, the driver must locate and activate the mobile telephone. When the driver attempts to dial a telephone number, he must divert his eyes from the road to the mobile telephone to locate the number keys. Whenever a driver must divert his eyes from the road, the driver is risking the possibility of an accident.

In response to these problems, some countries have outlawed the use of non-speaker mobile telephones in vehicles. However, the use of speaker phones solve only some of these problems. Drivers using speaker mobile telephones still have to locate and activate the mobile telephone. In addition, whenever a driver wishes to make a telephone call, the driver must dial the telephone number. To dial a telephone number the driver must divert his eyes from the road to the mobile telephone risking the possibility of causing an accident.

Therefore there is a need to reduce the risk of a driver being involved in an accident when a driver is using a mobile telephone while operating a vehicle.

SUMMARY OF THE INVENTION

The present invention addresses the need for reducing the risk of a driver being involved in an accident when a driver is using a mobile telephone while operating a vehicle.

It is therefore an object of the present invention to allow a driver to use a mobile telephone in a hands-free manner.

A further object of the present invention is to allow a driver to use voice commands to operate a mobile telephone.

A further object of the present invention is to allow a driver to place telephone calls using a voice recognition system.

A further object of the present invention is to allow a driver to call pre-stored telephone numbers using a voice recognition system.

A further object of the present invention is to allow a driver to answer a telephone call using a voice recognition system.

A further object of the present invention is to allow a driver to select options from a menu using a voice recognition system.

The present invention is a voice recognition system that allows a driver to reduce his risk of being involved in an accident while operating a vehicle and using a mobile telephone. The present invention is a mobile telephone having a voice recognition system which receives and acts on voice commands. Once the voice recognition system is activated, the mobile telephone can be operated in a hands free mode. The voice recognition system is used to automatically perform the same functions as a keypad. Since a driver can use just the voice recognition system, a keypad is no longer necessary. A mobile telephone equipped with a voice recognition system of the present invention requires only two buttons, a power button and a voice recognition button. The power button is used to turn the mobile telephone on and off. The voice recognition button is used to activate and deactivate the voice recognition system.

To provide further safety, the voice recognition button is implemented to provide easier activation of the voice recognition system. To distinguish the voice recognition button from other buttons or keys located on a mobile telephone, the voice recognition button is physically enhanced to differ from the other buttons. The enhanced voice recognition button can differ from the other buttons in type, size, color, texture and location. By using a different type of button for the enhanced voice recognition button, the button will be easier to distinguish. By using a larger button for the enhanced voice recognition button, the button will be easier to feel. By using a bright or different color button for the enhanced voice recognition button, the button will be easier to see as well. By using a different textured button for the enhanced voice recognition button, the button will feel different from the other buttons and be easier to locate by touch. The enhanced voice recognition button can also be located or positioned in a more accessible or convenient location on the mobile telephone to provide easy access.

Once the voice recognition system is activated, a driver can use voice commands to execute basic telephone functions. For instance, the command "dial" followed by a telephone number can be used to command the mobile telephone to dial the telephone number which the driver dictated. The command "call" followed by either a name or number can be used to dial a pre-stored telephone number. The command "answer" can be used to allow the driver to receive an incoming telephone call. All of these commands allow a driver to operate his vehicle and mobile telephone without having to hold the mobile telephone. Since the mobile telephone can be operated in a hands free mode, the driver is less susceptible to being involved in an accident.

DETAILED DESCRIPTION OF THE PREFERRED EMBODIMENT

Figure 1:
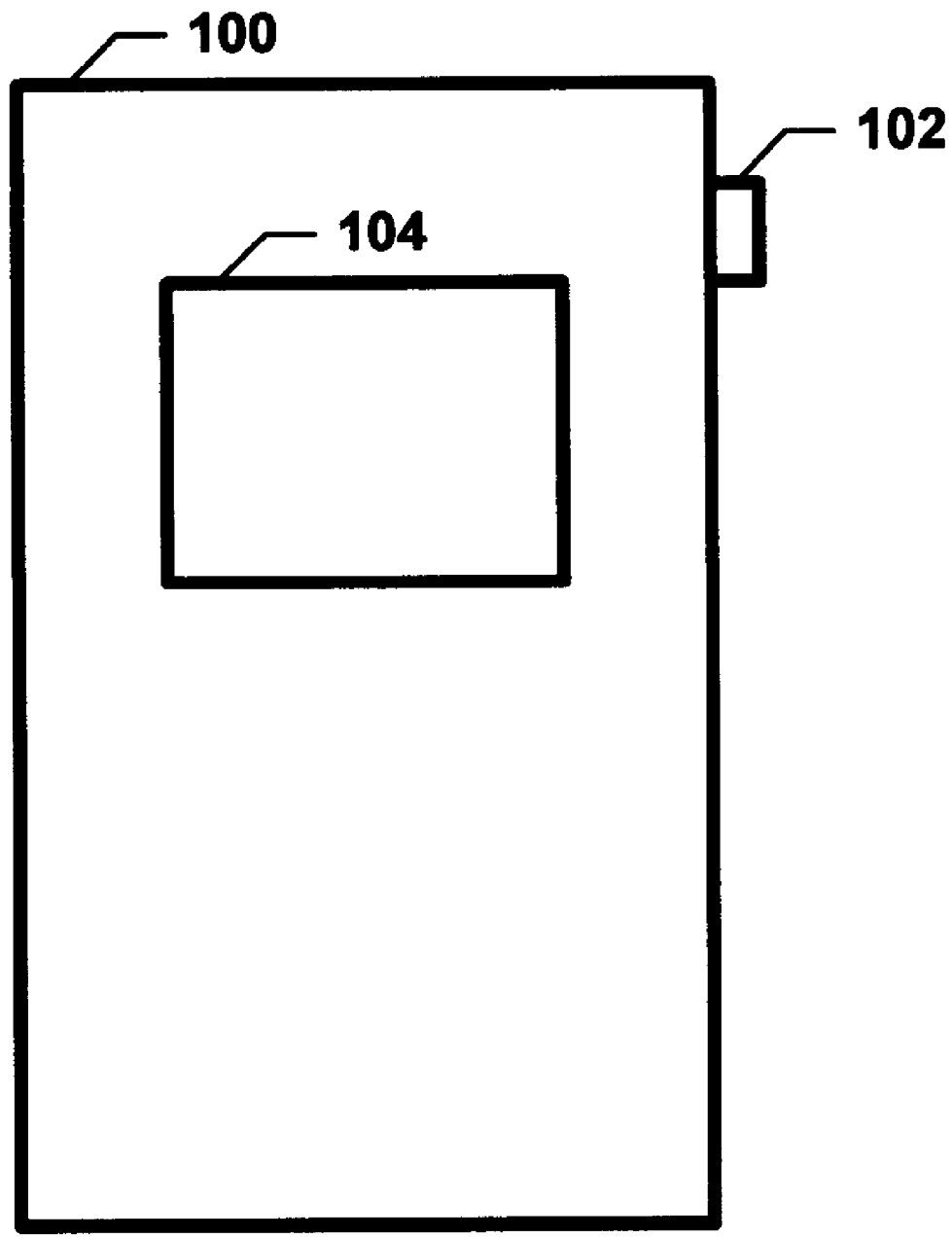
FIG. 1 shows a mobile telephone having a power button and a voice recognition button.

Although the present invention is described for mobile telephones, the present invention can be incorporated into other types of telephones as well.

The term driver is used to describe the user of the mobile telephone. The term driver and user can be used interchangeably. However since the present invention is directed towards reducing the risk of accidents on the roadways, the term driver will be used in this specification. The term driver should not be considered as a limitation. Anyone can use the voice recognition system providing the voice recognition system can recognize and act on the user's voice.

Referring to FIG. 1, a mobile telephone having only a power button and a voice recognition button is shown. In other embodiments, mobile telephone 100 can include a plurality of buttons. As shown, mobile telephone 100 includes power button 102 and voice recognition button 104. Power button 102 is used to turn the mobile telephone on and off. Voice recognition system button 104 is used for activating and deactivating the voice recognition system.

To provide further safety, voice recognition button 104 is implemented to provide easier activation of the voice recognition system. To distinguish voice recognition button 104 from other buttons or keys located on a mobile telephone, voice recognition button 104 can be physically enhanced to differ from the other buttons. The enhanced voice recognition button can differ from the other buttons in type, size, color, texture and location.

By using different types of buttons, the enhanced voice recognition button will be easier to distinguish. By using a larger button for the enhanced voice recognition button, the button is easier to see and feel. By using a bright or different color for the enhanced voice recognition button, the button is easier to see as well. By using a different texture for the enhanced voice recognition button, the button feels different from the other buttons and is easier to locate by touch. The enhanced voice recognition button can also be located or positioned in a more accessible or convenient location on the mobile telephone to provide easy access. For instance, the power button can be located on the side of the mobile telephone and the enhanced voice recognition button can be located on top of the mobile telephone.

The voice recognition system having an enhanced voice recognition button can also be employed on other traditional mobile telephones (a mobile telephone having a keypad). By using the same types of enhancements (type, size, color, texture, and location) for the voice recognition button, a driver can activate the voice recognition system in an easy and safe manner. Once the voice recognition system is activated, the driver can use the mobile telephone in a hands free mode. In addition, by using the voice recognition system with a traditional mobile telephone, the driver can elect to use either the voice recognition system or the keypad.

The voice recognition system is used to recognize and act on command words. Voice recognition systems known in the art such as, those that train on a user's speech and others that are capable of processing speech of a limited subset of numbers and words can be used in the present invention. Although the present invention requires a voice recognition system, the type of voice recognition system is not a limitation.

At least one loudspeaker and at least one microphone are necessary to allow a driver to operate the mobile telephone in a hands free mode. The loudspeaker is used to amplify the speech that is being received. The microphone is used to capture the driver's speech.

For incoming calls there are several options that can be employed to answer the telephone call. In the preferred embodiment, an incoming call automatically activates the voice recognition system to allow the driver to answer the telephone call using voice commands. Once the mobile telephone is answered, the driver is able to communicate with the other party.

In another embodiment, the driver answers the mobile telephone by pressing the voice recognition button which activates the voice recognition system. Once the voice recognition system is activated the driver can communicate with the calling party. Since the voice recognition button is easy is locate, the driver can feel for the voice recognition button or give a quick glance to locate the voice recognition button. Since the driver is able to easily locate the voice recognition button, the driver is not increasing the risk of being involved with an accident.

To deactivate the voice recognition system, several methods can be employed as well. In the preferred embodiment, the voice recognition system can be activated by pressing or depressing the enhanced voice recognition button. In another embodiment, the voice recognition system can be deactivated by a voice command. For example, the command "off" can be used to deactivate the voice recognition system.

For outgoing telephone calls in the preferred embodiment, the driver activates the voice recognition system by pressing the voice recognition button. Once the voice recognition system is activated the driver can use voice commands to place a telephone call. Since the voice recognition button is easy is locate, the driver can feel for the voice recognition button or give a quick glance to locate the voice recognition button. In another embodiment, the voice recognition system can be activated by a voice command. For example, the command "on" can be used to activate the voice recognition system.

The voice recognition system also allows a driver to select mobile telephone options through speech when the driver accesses an option menu. For instance, if the driver calls a telephone number and the menu asks for the caller to enter a number for an option, the driver can dictate the option number to the voice recognition system which acts upon the driver's command. The voice recognition system would generate and transmit a response according to the driver's command. The transmitted response would be the same as if the driver entered his option via the mobile telephone keypad.

The following set of voice commands are used for example purposes only and should not be considered as a limitation. The command "dial" followed by a telephone number automatically dials the dictated telephone number. For example, "dial 18009999999" results in the automatic dialing of the telephone number 1-800-999-9999.

The command "call" followed by either a name or preset number automatically dials a pre-stored telephone number. For example, "call 1" would result in the automatic dialing of the first pre-stored number. Similarly, the command "call Jon" results in the automatic dialing of the stored number for Jon. In addition, the voice recognition system can be further utilized to recognize additional stored terms, such as "call Jon at home" or "call Jon at work." These commands would result in the automatic dialing of the desired telephone number.

The command "select" can be used to select menu options in a hands free mode. For example, if a driver calls a number and the menu requires the caller to select "1" for option A or "2" for option B, the driver would say "select 1" and the voice recognition system would select option A for the driver.

The command "answer" can be used to answer the mobile telephone in a hands free mode. The mobile telephone can be set in a mode where an incoming call activates the voice recognition system to allow the driver to have a telephone conversation using the mobile telephone's loudspeaker and microphone.

The command "store" can be used to store a telephone number. The driver can store telephone numbers under a number header or a name header. The number headers can refer to a set of predetermined numbers or numbers created by the driver. Name headers refer to headers created by the driver.

In the preferred embodiment, the voice commands can include an additional command term to prevent the possibility of a false command which can occur during a telephone conversation. For example the term "command" can be added in front of the command words to prevent a false command. Without the additional command term, if during a conversation the driver says "I will call home," if the term "call home" is a name header, the voice recognition system would recognize the term "call home" and could disconnect the present connection and initiate calling the pre-stored "home" number.

Although the present invention has been described for use in a mobile telephone, in a similar vein, the present invention can be incorporated in other types of telephones systems, such as cellular, fixed wired and other different types of telephone systems. The present invention can be useful for those who are vision impaired. In particularly, an incoming call can activate the voice recognition system to allow the vision impaired person to answer the telephone using voice commands. In addition, the voice recognition button can include brail annotation to further assist a vision impaired person.

A voice recognition system for mobile telephones has been described in detail for the purpose of illustration. It is understood that such detail is solely for that purpose, and variations can be made therein by those skilled in the art without departing from the scope of the invention as disclosed.

What is claimed is:

1. A mobile telephone having a voice recognition system for using the mobile telephone in a hands free mode, wherein the mobile telephone comprises:
   a plurality of buttons, the plurality of buttons excluding telephone keypad buttons;
   a voice recognition system for recognizing and acting on spoken commands;
   an enhanced voice recognition button as one of the plurality of buttons connected to the voice recognition system for activating the voice recognition system when pressed, the voice recognition system, upon activation and responsive to a first one of the spoken commands, operable to store a dictated telephone number into the voice recognition system without use of telephone keypad buttons; and
   a power button, the power button being different from the enhanced voice recognition button, wherein the power button and the enhanced voice recognition button are the only ones of the plurality of buttons.

2. The mobile telephone of claim 1, wherein the enhanced voice recognition button is larger in size than the power button.

3. The mobile telephone of claim 1, wherein the enhanced voice recognition button is a different color than the power button.

4. The mobile telephone of claim 1, wherein the enhanced voice recognition button differs in texture from the power button.

5. The mobile telephone of claim 1, wherein the enhanced voice recognition button is located on a top of the mobile telephone and the power button is located on a side of the mobile telephone.

6. The mobile telephone of claim 1, wherein the enhanced voice recognition button includes brail annotation.

7. The mobile telephone of claim 1, wherein the voice recognition system, upon activation and responsive to a second one of the spoken commands, performs telephone functions without use of telephone keypad buttons.

8. The mobile telephone of claim 7, wherein the voice recognition system of the mobile telephone, upon activation and responsive to a third one of the spoken commands, performs automatic dialing of a spoken telephone number without use of telephone keypad buttons.

9. The mobile telephone of claim 7, wherein the voice recognition system of the mobile telephone, upon activation and responsive to a fourth one of the spoken commands, performs automatic dialing of a pre-stored telephone number without use of telephone keypad buttons.

10. The mobile telephone of claim 1, wherein the voice recognition system of the mobile telephone, upon activation and responsive to a fifth one of the spoken commands automatically converts and enters spoken entries for a menu system without use of telephone keypad buttons.

11. The mobile telephone of claim 1, wherein the voice recognition system is automatically activated by an incoming telephone call.

12. A mobile telephone having a voice recognition system for using the mobile telephone in a hands free mode, wherein the mobile telephone comprises:
   a power button to turn the mobile telephone on and off;
   a voice recognition system for recognizing and acting on voice commands; and
   an enhanced voice recognition button connected to the voice recognition system for activating the voice recognition system when pressed, the enhanced voice recognition button and the power button being the only buttons of the mobile telephone, the voice recognition system, upon activation and responsive to a first one of the voice commands, operable to store a dictated telephone number into the voice recognition system without use of telephone keypad buttons.

13. The mobile telephone of claim 12, where the enhanced voice recognition button differs in the type of button from the power button.

14. The mobile telephone of claim 13, wherein the enhanced voice recognition button is larger in size than the power button.

15. The mobile telephone of claim 13, wherein the enhanced voice recognition button is a different color than the power button.

16. The mobile telephone of claim 13, wherein the enhanced voice recognition button differs in texture from the power button.

17. The mobile telephone of claim 13, wherein the enhanced voice recognition button is located on a top of the mobile telephone and the power button is located on a side of the mobile telephone.

18. The mobile telephone of claim 13, wherein the enhanced voice recognition button includes brail annotation.

19. The mobile telephone of claim 12, wherein the voice recognition system, upon activation and responsive to a second one of the voice commands, performs telephone functions without use of telephone keypad buttons.

20. The mobile telephone of claim 12, wherein the voice recognition system of the mobile telephone, upon activation and responsive to a third one of the voice commands, performs automatic dialing of a spoken telephone number without use of telephone keypad buttons, the third one of the voice commands comprising the word "dial".

21. The mobile telephone of claim 12, wherein the voice recognition system of the mobile telephone, upon activation and responsive to a fourth one of the voice commands, performs automatic dialing of a pre-stored telephone number without use of telephone keypad buttons, the fourth one of the voice commands comprising the word "call".

22. The mobile telephone of claim 12, wherein the voice recognition system of the mobile telephone, upon activation and responsive to a fifth one of the voice commands, automatically converts and enters spoken entries for a menu system without use of telephone keypad buttons.

23. The mobile telephone of claim 12, wherein the voice recognition system is automatically activated by an incoming call.

24. A telephone having a voice recognition system for using the telephone in a hands free mode, wherein the telephone comprises:
   a plurality of buttons, the plurality of buttons excluding telephone keypad buttons;
   a voice recognition system for recognizing and acting on spoken commands;
   an enhanced voice recognition button as one of the plurality of buttons connected to the voice recognition system for activating the voice recognition system when pressed, the voice recognition system, upon activation and responsive to a first one of the spoken commands, operable to store a dictated telephone number into the voice recognition system without use of telephone keypad buttons; and
   a power button, the power button being different from the enhanced voice recognition button, wherein the power button and the enhanced voice recognition button are the only ones of the plurality of buttons.

25. The telephone as in claim 24, wherein the enhanced voice recognition button is larger in size than the power button.

26. The telephone as in claim 24, wherein the enhanced voice recognition button is a different color than the power button.

27. The telephone as in claim 24, wherein the enhanced voice recognition button differs in texture from the power button.

28. The telephone as in claim 24, wherein the enhanced voice recognition button is located on a top of the telephone and the power button is located on a side of the telephone.

29. The telephone of claim 24, wherein the enhanced voice recognition button includes brail annotation.

30. The telephone as in claim 24, wherein the voice recognition system, upon activation and responsive to a second one of the spoken commands, performs telephone functions without use of telephone keypad buttons.

31. The telephone as in claim 24, wherein the voice recognition system, upon activation and responsive to a third one of the spoken commands, performs automatic dialing of a spoken telephone number without use of telephone keypad buttons.

32. The telephone as in claim 24, wherein the voice recognition system, upon activation and responsive to a fourth one of the spoken commands, performs automatic dialing of a pre-stored telephone number without use of telephone keypad buttons.

33. The telephone as in claim 24, wherein the voice recognition system, upon activation and responsive to a fifth one of the spoken commands, automatically converts and enters spoken entries for a menu system without use of telephone keypad buttons.

34. The telephone as in claim 24, wherein the voice recognition system is automatically activated by an incoming telephone call.

35. A telephone having voice recognition for using the telephone in a hands free mode, wherein the telephone comprises:
   a power button to turn the telephone on and off;
   an enhanced voice recognition button for activating the voice recognition when pressed, the enhanced voice recognition button and the power button being the only buttons of the telephone; and
   a voice recognition system for recognizing and acting on voice commands to provide the voice recognition, the voice recognition system connected to the enhanced voice recognition button, the voice recognition system, when the enhanced voice recognition button is pressed and responsive to a first one of the voice commands, operable to store a dictated telephone number into the voice recognition system without use of telephone keypad buttons.

36. The telephone of claim 35, where the enhanced voice recognition button differs in the type of button from the power button.

37. The telephone of claim 36, wherein at the enhanced voice recognition button is larger in size than the power button.

38. The telephone of claim 36, wherein the enhanced voice recognition button is a different color than the power button.

39. The telephone of claim 36, wherein the enhanced voice recognition button differs in texture from the power button.

40. The telephone of claim 36, wherein the enhanced voice recognition button is located on a top of the telephone and the power button is located on a side of the telephone.

41. The telephone of claim 36, wherein the enhanced voice recognition button includes brail annotation.

42. The telephone of claim 36, wherein the voice recognition system, upon activation and responsive to a second one of the voice commands, performs telephone functions without use of telephone keypad buttons.

43. The telephone of claim 36, wherein the voice recognition system, upon activation and responsive to a third one of the voice commands, performs automatic dialing of a spoken telephone number without use of telephone keypad buttons, the third one of the voice commands comprising the word "dial".

44. The telephone of claim 36, wherein the voice recognition system, upon activation and responsive to a fourth one of the voice commands, performs automatic dialing of a pre-stored telephone number without use of telephone keypad buttons, the fourth one of the voice commands comprising the word "call".

45. The telephone of claim 36, wherein the voice recognition system, upon activation and responsive to a fifth one of the voice commands, automatically converts and enters spoken entries for a menu system without use of telephone keypad buttons.

46. The telephone of claim 36, wherein the voice recognition system is automatically activated by an incoming call.

* * * * *